(12) United States Patent
Mouffron et al.

(10) Patent No.: US 11,533,162 B2
(45) Date of Patent: Dec. 20, 2022

(54) METHOD FOR VERIFICATION OF INTEGRITY AND DECRYPTION OF AN ENCRYPTED MESSAGE, ASSOCIATED CRYPTOMODULE AND TERMINAL

(71) Applicant: AIRBUS DS SLC, Elancourt (FR)

(72) Inventors: Marc Mouffron, Saint Rémy les Chevreuse (FR); Nathalie Renault, Montigny le Bretonneux (FR)

(73) Assignee: AIRBUS DS SLC, Elancourt (FR)

( * ) Notice: Subject to any disclaimer, the term of this patent is extended or adjusted under 35 U.S.C. 154(b) by 397 days.

(21) Appl. No.: 16/722,830

(22) Filed: Dec. 20, 2019

(65) Prior Publication Data
US 2020/0204347 A1   Jun. 25, 2020

(30) Foreign Application Priority Data

Dec. 21, 2018   (FR) ....................... 1873777

(51) Int. Cl.
| H04L 29/06 | (2006.01) |
| H04L 9/06 | (2006.01) |
| G06F 21/64 | (2013.01) |
| H04L 9/32 | (2006.01) |

(52) U.S. Cl.
CPC ............ *H04L 9/0637* (2013.01); *G06F 21/64* (2013.01); *H04L 9/0643* (2013.01); *H04L 9/3242* (2013.01)

(58) Field of Classification Search
None
See application file for complete search history.

(56) References Cited

U.S. PATENT DOCUMENTS

2016/0277373 A1*   9/2016   Murray ............... H04L 63/0876

OTHER PUBLICATIONS

Dworkin, M., "Recommendation for Block Cipher Mode of Operation: Galois/Counter Mode (GCM) and GMAC," NIST Special Publication 800-38D, National Institute of Standards and Technology, Nov. 2007, XP055537161, 39 pages. (Year: 2007).*
Search Report and Written Opinion as issued in French Patent Application No. 1873777, dated Oct. 14, 2019.

(Continued)

*Primary Examiner* — Andrew J Steinle
(74) *Attorney, Agent, or Firm* — Pillsbury Winthrop Shaw Pittman LLP

(57) ABSTRACT

A method for verification of integrity and decryption of an encrypted message including ordered data blocks, the method performed by a cryptomodule and including storing or activating an integrity key; calculating an initial integrity code; generating a verification key and storing it; for each data block: storing the data block; updating an intermediate integrity code with the integrity key, the data block and the initial integrity code or the intermediate integrity code of the preceding data block; generating an authentication code using the verification key; deleting the data block; analysing the final integrity code; if the integrity is verified: storing or activating a decryption key specific to the encrypted message; for each data block: storing the data block; verifying the authenticity and the row of the data block using its authentication code; decrypting the data block with the decryption key; transmitting to the terminal the decrypted data block.

13 Claims, 1 Drawing Sheet

(56) References Cited

OTHER PUBLICATIONS

Dworkin, M., "Recommendation for Block Ciper Mode of Operation: Galois/Counter Mode (GCM) and GMAC," NIST Special Publication 800-38D, National Institute of Standards and Technology, Nov. 2007, Retrieved from the Internet: URL:https://nvlpubs.nist.gov/nistpubs/Legacy/SP/nistspecialpublication800-38d.pdf, XP055537161, 39 pages.

* cited by examiner

METHOD FOR VERIFICATION OF INTEGRITY AND DECRYPTION OF AN ENCRYPTED MESSAGE, ASSOCIATED CRYPTOMODULE AND TERMINAL

CROSS REFERENCE TO RELATED APPLICATIONS

This application claims priority to French Patent Application No. 1873777, filed Dec. 21, 2018, the entire content of which is incorporated herein by reference in its entirety.

FIELD

The technical field of the invention is that of methods making it possible to verify the integrity of an encrypted message then, if need be, to decrypt it.

The present invention relates to a method for verification of integrity and decryption of an encrypted message. The present invention also relates to a cryptomodule, a terminal and a computer programme product making it possible to implement such a method.

BACKGROUND

Authenticated encryption is an encryption mode making it possible to ensure at one and the same time the confidentiality, the integrity and the authenticity of encrypted data. This type of encryption is recommended by the 3rd Generation Partnership Project (3GPP) technical specification governing MCS (Mission Critical Services) type mobile networks.

A conventional authenticated encryption mode is the Galois Counter Mode (GCM). The decryption of an encrypted message by the GCM requires the storage of the entirety of the decrypted message before being able to verify its integrity and, if need be, of being able to deliver it in clear.

This operating mode is not compatible with cryptomodules, that is to say electronic components used for cryptography, for example in mobile telephones or portable computers, which comprise memories having reduced storage capacities. Thus, it is impossible for the cryptomodule of a mobile telephone to store the entirety of an encrypted video.

There thus exists a need to be able to decrypt an encrypted message in a cryptomodule having a memory with reduced storage capacity by an authenticated encryption mode, whatever the size of the encrypted message.

SUMMARY

An aspect of the invention offers a solution to the aforementioned problems, by enabling a cryptomodule having a memory of reduced capacity to decrypt any encrypted message by an authenticated encryption mode.

A first aspect of the invention relates to a method for verification of integrity and decryption of an encrypted message comprising a plurality of ordered data blocks Bi for i ranging from 1 to N, N being strictly greater than 1, the encrypted message being stored in a memory of a terminal, said terminal comprising a cryptomodule including a cryptomodule memory, the method comprising the following steps carried out by the cryptomodule:

Storing or activating, in the cryptomodule memory, an integrity key CI specific to the encrypted message;
Calculating an initial integrity code I0 using the integrity key CI and storing it in the cryptomodule memory;
Generating a verification key CV and storing it in the cryptomodule memory;
For each data block Bi:
Storing the data block Bi in the cryptomodule memory;
Calculating an intermediate integrity code Ii and storing it in the cryptomodule memory:
If the data block Bi is the first data block B1 of the encrypted message, the intermediate integrity code I1 is calculated using the integrity key CI, the first data block B1 and the initial integrity code I0;
If not, the intermediate integrity code Ii is calculated using the integrity key CI, the data block Bi and the intermediate integrity code Ii−1 of the data block Bi−1 preceding the data block Bi in the encrypted message;
Generating an authentication code Ai of the data block Bi using the verification key CV, the authentication code Ai depending on the row i of the data block Bi, and transmitting it to the terminal;
Deleting the data block Bi from the cryptomodule memory;
Analysing a final integrity code In corresponding to the intermediate integrity code In of the last data block Bn of the encrypted message to verify the integrity of the encrypted message;
If the integrity of the encrypted message is verified:
Storing or activating, in the cryptomodule memory, a decryption key CD specific to the encrypted message;
For each data block Bi of the encrypted message:
Storing the data block Bi in the cryptomodule memory;
Receiving from the terminal the authentication code of the data block Bi and verifying the authenticity and the row i of the data block Bi using its authentication code Ai;
If the authenticity and the row i of the data block Bi are verified, decrypting the data block Bi using the decryption key CD and transmitting it to the terminal for storing it in the memory of the terminal;
Deleting the encrypted data block Bi and the decrypted data block Di from the cryptomodule memory.

Thanks to the invention, the encrypted message is divided into several blocks. Its integrity is verified block by block and it is next decrypted block by block once the integrity of the entirety of the message has been verified. The cryptomodule memory thus never stores more than two data blocks. In addition, the method is secured by the authentication codes which make it possible to add a level of security between the step of verification of the integrity and the step of decryption of the encrypted message.

Apart from the characteristics that have been mentioned in the preceding paragraph, the method according to a first aspect of the invention may have one or more complementary characteristics among the following, considered individually or according to all technically possible combinations thereof.

According to an embodiment, the method comprises a step consisting in deleting or deactivating the integrity key CI of the cryptomodule memory and in deleting the integrity codes Ii of the cryptomodule memory, just before the step consisting in storing or activating, in the cryptomodule memory, a decryption key CD specific to the encrypted message.

Thus, the cryptomodule memory stores either the integrity key CI, or the decryption key CD and not both, which makes it possible to economise the storage capacity.

According to an embodiment, the method comprises a step consisting in deleting or deactivating the verification key CV and the decryption key CD.

Thus, the cryptomodule is operational to carry out the method for another encrypted message.

According to an embodiment which can be combined with the preceding embodiment, the authentication codes Ai are generated by a secrete key authentication algorithm using the verification key CV as secrete key.

According to an example of this embodiment, the secrete key authentication algorithm is the algorithm HMAC SHA 256.

Thus, the authentication codes Ai generated and the key used require a reduced storage capacity.

According to an embodiment, the verification key CV is generated randomly.

Thus, this makes it possible to avoid having to store several verification keys CV in the cryptomodule memory.

According to a first embodiment which can be combined with the preceding embodiments, the method is of GCM (Galois Counter Mode) type.

According to a second embodiment, the method is of CWC (Carter Wegman Counter) type.

Thus, the method uses an authenticated encryption mode.

According to an embodiment which can be combined with the preceding embodiments, a data block Bi comprises 512 bits.

A second aspect of the invention relates to a terminal comprising a cryptomodule according to a third aspect of the invention and a memory.

According to an embodiment, the terminal is compatible with the 3GPP TS 33.180 technical specification.

A third aspect of the invention relates to a cryptomodule configured to implement the steps of the method according to a first aspect of the invention, comprising a cryptomodule memory.

According to an embodiment, the cryptomodule memory is a non-transitory memory that has a storage capacity less than the size of the encrypted message.

According to an example of this embodiment, the cryptomodule memory has a storage capacity chosen to store substantially the verification key CV, the integrity codes Ii, two data blocks Bi, Di or an encrypted data block Bi and an authentication code Ai, and the integrity key CI or the decryption key CD.

Thus, the number of elements to store in the cryptomodule memory is minimised with respect to a method with conventional authentication encryption mode.

A fourth aspect of the invention relates to a computer programme product including instructions which, when the programme is executed by a computer, lead it to implement the method according to a first aspect of the invention. The computer programme is stored in a non-transitory memory.

The invention and its different applications will be better understood on reading the description that follows and by examining the figures that accompany it.

BRIEF DESCRIPTION OF THE DRAWINGS

The figures are presented for indicative purposes and in no way limit the invention.

DETAILED DESCRIPTION

Unless stated otherwise, a same element appearing in the different figures has a single reference.

A first aspect of the invention relates to a method 100 for verification of integrity and decryption of an encrypted message.

Encryption of a message is a process of transformation of the content of the message in such a way as to make it unintelligible to anyone other than the addressee holder of a decryption key making it possible for the addressee to carry out the decryption of the message.

Decryption is the opposite process to encryption, which consists in transforming the content of the message by means of the decryption key to make it once more intelligible.

An encrypted message is thus a message having undergone a process of encryption and which is thus unintelligible for third parties.

The integrity of a message is verified if the message has not undergone any voluntary or accidental alteration or destruction during its processing, that is to say, for example, during its encryption, its storage or its transmission, and that the message thus conserves a format enabling its decryption.

An encryption mode having to verify the integrity of an encrypted message before decrypting it is called authenticated encryption. The encryption mode is for example of GCM (Galois Counter Mode) or CWC (Carter Wegman Counter) type.

The encrypted message comprises at least one data block Bi, the data blocks Bi being ordered for i ranging from 1 to N. Thus, the data block B3 is the third data block Bi of the encrypted message.

For example, a data block Bi comprises 512 bits.

A third aspect of the invention relates to a cryptomodule 200 enabling the implementation of the method according to a first aspect of the invention.

"Cryptomodule" is taken to mean an electronic component used for cryptography, that is to say for the encryption/decryption of messages. The electronic component may include one or more electronic circuits configured to perform the functions and operations of the cryptomodule (e.g., microelectronic circuits).

The cryptomodule 200 is for example a smart card or an electronic chip.

A second aspect of the invention relates to a terminal 300.

The terminal 300 is an electronic device, which is for example a mobile telephone or more specifically a smartphone, a tablet or instead a portable computer. The electronic device includes a processor and a memory. The electronic device may also include a transmitter and a receiver to transmit and receive signals.

For example, the terminal 300 is compatible with the 3GPP TS 33.180 technical specification.

Figure 2:
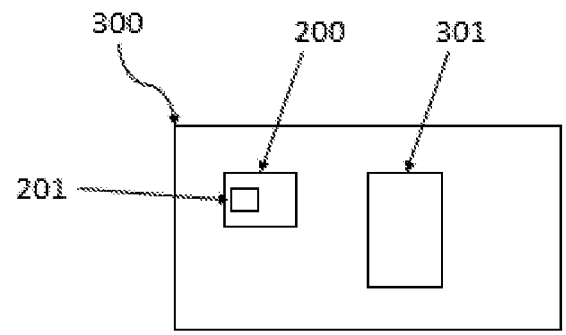
FIG. 2 shows a schematic representation of a terminal according to a second aspect of the invention comprising a cryptomodule according to a third aspect of the invention.

FIG. 2 shows a schematic representation of the terminal 300.

The terminal 300 comprises a memory 301 and the cryptomodule 200.

The cryptomodule 200 comprises a memory 201 having a storage capacity less than the storage capacity of the memory 301 of the terminal 300, in particular, the memory 301 of the terminal 300 has a storage capacity sufficient to store the encrypted message whereas the memory 201 of the cryptomodule 200 does not necessarily have sufficient storage capacity to store the encrypted message.

Figure 1:
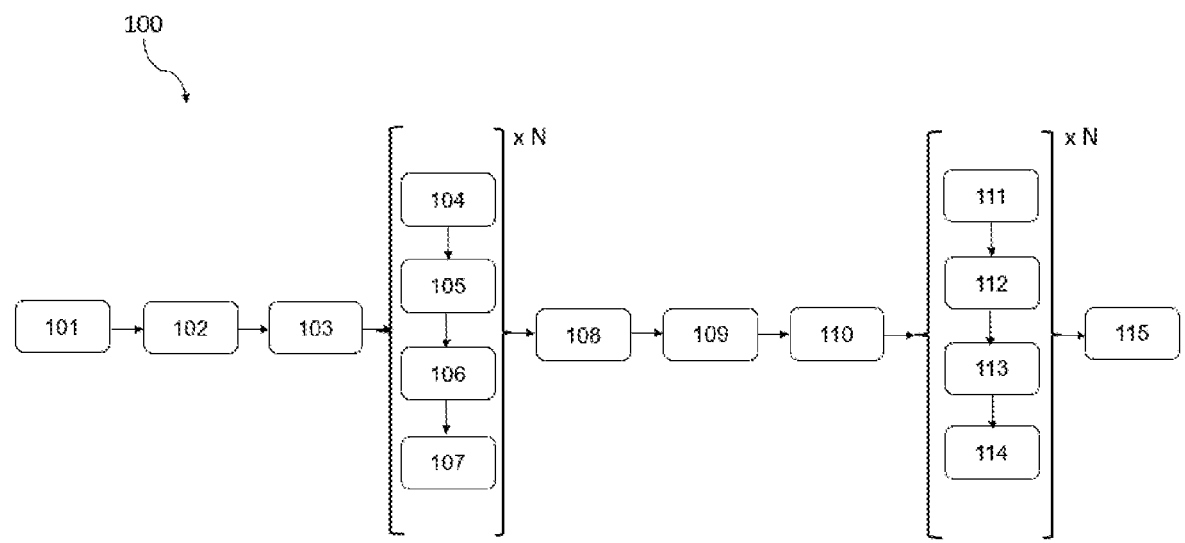
FIG. 1 shows a block diagram of the method according to a first aspect of the invention.

FIG. 1 shows a block diagram of the method 100 according to a first aspect of the invention.

The method 100 according to a first aspect of the invention comprises several steps implemented by the cryptomodule 200.

Initially, the encrypted message is stored in the memory 301 of the terminal 300.

During a first step 101 of the method 100, the cryptomodule 200 stores or activates in its memory 201 an integrity key CI specific to the encrypted message. Indeed, the integrity key CI of the encrypted message may be either supplied to the cryptomodule 200 at the moment of the operations, or be present a priori in the cryptomodule 200 and an activation is then sufficient to be able to use it.

When the integrity key CI is not present a priori in the cryptomodule 200, the first step 101 of the method 100 consists, for the cryptomodule 200, in selecting from among the integrity keys CI stored in the terminal 300, the integrity key CI corresponding to the encrypted message.

At the end of the first step 101 of the method 100, the cryptomodule 200 can use the integrity key CI making it possible to verify the integrity of the encrypted message.

During a second step 102 of the method 100, the cryptomodule 200 generates a verification key CV and stores the verification key CV in its memory 201.

The verification key CV is for example generated randomly.

During the third step 103 of the method 100, the cryptomodule 200 calculates an initial integrity code I0 from the integrity key CI. Once calculated, the initial integrity code I0 is stored in the cryptomodule memory 201.

The initial integrity code I0 is for example a constant function. The initial integrity code I0 is for example generated by the AES (Advanced Encryption Standard) algorithm from the integrity key CI.

The fourth 104, fifth 10, sixth 106 and seventh 107 steps of the method 100 are next carried out for each data block Bi of the encrypted message.

During the fourth step 104 of the method 100, the cryptomodule 200 stores a data block Bi in its memory 201.

During the fifth step 105 of the method 100, the cryptomodule 200 calculates an intermediate integrity code Ii. This intermediate integrity code Ii is stored in the cryptomodule memory 201.

The intermediate integrity code Ii is calculated using the integrity key CI, the stored data block Bi and the intermediate integrity code Ii−1 of the data block Bi−1 preceding the data block Bi in the encrypted message. For example, the third integrity code I3 is calculated from the integrity key CI, the third data block B3 and the second intermediate integrity code I2 calculated from the second data block B2.

For example, the intermediate integrity code Ii is expressed in the following manner: Ii=(Ii−1+Bi)*CI.

The intermediate integrity code I1 of the first data block B1 is calculated using the integrity key CI, the stored data block B1 and the initial integrity code I0.

During the sixth step 106 of the method 100, the cryptomodule calculates an authentication code Ai for the data block Bi depending on its row i in the encrypted message.

The authentication code Ai is calculated using the verification key CV. For example, the authentication code Ai is calculated by a secrete key authentication algorithm using the verification key CV as secrete key. This type of algorithm functions with a secrete key of reduced size and generates authentication codes of reduced size, which is compatible with the problem of reduced storage capacity of the cryptomodule 200.

For example, the secrete key authentication algorithm is the algorithm HMAC SHA 256. The verification key CV is of size 256 bits and the authentication codes generated are then 256 bits.

The cryptomodule 200 then sends the authentication code Ai to the terminal 300 so that it stores it in its memory 301.

During the seventh step 107 of the method 100, the cryptomodule 200 deletes the processed data block Bi from its memory 201.

Once the fourth 104, fifth 105, sixth 106 and seventh 107 steps of the method 100 have been carried out for each data block Bi of the encrypted message, the cryptomodule 200 carries out an eighth step 108 of the method 100 which consists in analysing a final integrity code In of the terminal 300 to verify the integrity of the encrypted message.

The final integrity code In corresponds to the intermediate integrity code In of the last data block Bn of the encrypted message. Thus, the final integrity code In depends on all the intermediate integrity codes Ii calculated for each data block Bi and thus makes it possible to verify the integrity of all of the data blocks Bi and thus the encrypted message as a whole.

The analysis of the final integrity code In comprises, for example, a step of calculating an integrity value from at least one part of the final integrity code In, and a step of comparing the integrity value to a predetermined reference integrity value. The integrity value and the reference integrity value are, for example, numbers in a predefined format. Possible formats are for example a text format or a computer format such as integer, float or double formats. For example, the integrity value is equal to the final integrity code In. For example, integrity is verified if the integrity value and the reference integrity value are the same, and not verified if the integrity value and the reference integrity value are different.

If the integrity of the encrypted message is not verified, the encrypted message cannot be decrypted. The method 100 is then interrupted.

If the integrity of the encrypted message is verified, it is then possible, in an authenticated encryption mode, to pass to the decryption of the encrypted message.

During a ninth optional step 109 of the method 100, the cryptomodule 200 deletes or deactivates the integrity key CI from its memory 201 and deletes the integrity codes Ii from its memory 201.

During a tenth step 110 of the method 100, the cryptomodule 200 stores or activates in its memory 201 a decryption key CD specific to the encrypted message. Indeed, the decryption key CD of the encrypted message may be either supplied to the cryptomodule 200 at the moment of the operations, or is present a priori in the cryptomodule 200 and an activation is then sufficient to be able to use it.

When the decryption key CD is not present a priori in the cryptomodule 200, the tenth step 110 of the method 100 consists, for the cryptomodule 200, in selecting from among the decryption keys CD stored in the terminal 300, the decryption key CD corresponding to the encrypted message.

At the end of the tenth step 110 of the method 100, the cryptomodule 200 can use the decryption key CD making it possible to decrypt the encrypted message.

The eleventh 111, twelfth 112, thirteenth 113 and fourteenth 114 steps of the method 100 are next carried out for each data block Bi of the encrypted message.

During the eleventh step 111 of the method 100, the cryptomodule 200 stores a data block Bi in its memory 201.

During the twelfth step 112 of the method 100, the cryptomodule 200 receives the authentication code Ai of the processed data block Bi.

The cryptomodule 200 then verifies the authenticity and the row i of the processed data block Bi using its authentication code Ai.

The authenticity of the data block Bi is verified if the data block Bi has not undergone alterations from the step 106 of generation of the authentication code Ai. The authentication code Ai thus makes it possible to add a level of security between the step 105 of verification of the integrity of the encrypted message and its decryption and to ensure that the message that is going to be decrypted is indeed the same message as that of which the integrity has been verified previously.

If the authenticity of the data block Bi is not verified, the encrypted message cannot be decrypted and the method 100 is then interrupted.

The verification of the row i makes it possible to ensure that the data blocks Bi of the encrypted message are decrypted in the same order as are the corresponding encrypted data blocks Bi in the encrypted message so that on reading the decrypted message, the decrypted data blocks Bi are in the correct order.

If the authenticity and the row i of the processed data block Bi are verified, the cryptomodule 200 carries out the thirteenth step 113 of the method 100 which consists in decrypting the processed data block Bi using the decryption key CD.

At the end of the step 113 of decryption of the data block Bi, the decrypted data block Bi is stored in the memory 301 of the terminal 300.

During the fourteenth step 114 of the method 100, the cryptomodule 200 deletes the processed data block Bi from its memory 201.

At the end of the eleventh 111, twelfth 112, thirteenth 113 and fourteenth 114 steps of the method 100, the encrypted message is entirely decrypted and the decrypted data blocks Bi are stored in the memory 301 of the terminal 300 in the same order as the corresponding data blocks Bi encrypted in the encrypted message.

The memory 201 of the cryptomodule 200 no longer contains any data block Bi.

During an optional fifteenth step 115 of the method 100, the cryptomodule 200 deletes or deactivates the verification key CV and the decryption key CD from its memory 201. Thus, at the end of the method 100, the memory 201 of the cryptomodule no longer contains any active key, no code having served during the method 100. The cryptomodule 200 can then again carry out the method 100 on another encrypted message.

Thus, during the method 100 illustrated in FIG. 1, the memory 201 of the cryptomodule 200 never comprises more than two keys, either the verification key CV and the integrity key CI, or the verification key CV and the decryption key CD, and never more than two data blocks Bi, Di.

Thus, the cryptomodule memory 200 may have a storage capacity chosen to allow it to store substantially the verification key CV, the integrity codes Ii, two data blocks Bi, Di or an encrypted data block Bi and an authentication code Ai and the integrity key CI or the decryption key CD.

Embodiments of the subject matter and the operations described in this specification (e.g. the cryptomodule and its operations) can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method for verification of integrity and decryption of an encrypted message comprising a plurality of ordered data blocks Bi for i ranging from 1 to N, N being strictly greater than 1, the encrypted message being stored in a memory of a terminal, said terminal comprising a cryptomodule including a cryptomodule memory, the method comprising the following steps carried out by the cryptomodule:
   storing or activating, in the cryptomodule memory, an integrity key CI specific to the encrypted message;
   calculating an initial integrity code I0 using the integrity key CI and storing it in the cryptomodule memory;
   generating a verification key CV and storing it in the cryptomodule memory;
   for each data block Bi:
      storing the data block Bi in the cryptomodule memory;
      calculating an intermediate integrity code Ii and storing it in the cryptomodule memory:
         if the data block Bi is the first data block B1 of the encrypted message, the intermediate integrity code Ii is calculated using the integrity key CI, the first data block B1 and the initial integrity code I0;
         if not, the intermediate integrity code Ii is calculated using the integrity key CI, the data block Bi and the intermediate integrity code Ii-1 of the data block Bi-1 preceding the data block Bi in the encrypted message;
      generating an authentication code Ai of the data block Bi using the verification key CV, the authentication code Ai depending on the row i of the data block Bi, and transmitting it to the terminal;
      deleting the data block Bi from the cryptomodule memory;
   analyzing a final integrity code In corresponding to the intermediate integrity code In of the last data block Bn of the encrypted message to verify the integrity of the encrypted message;
   if the integrity of the encrypted message is verified:
      storing or activating, in the cryptomodule memory, a decryption key CD specific to the encrypted message;
      for each data block Bi of the encrypted message:
         storing the data block Bi in the cryptomodule memory;
         receiving from the terminal the authentication code of the data block Bi and verifying the authenticity and the row i of the data block Bi using its authentication code Ai;
         If the authenticity and the row i of the data block Bi are verified, decrypting the data block Bi using the decryption key CD and transmitting it to the terminal for storing it in the memory of the terminal;
         deleting the encrypted data block Bi and the decrypted data block Di from the cryptomodule memory, and
   if the integrity of the encrypted message is not verified, the encrypted message is not decrypted.

2. The method according to claim 1, further comprising deleting or deactivating the integrity key CI of the cryptomodule memory and deleting the integrity codes Ii of the cryptomodule memory, just before the step of storing or activating, in the cryptomodule memory, a decryption key CD specific to the encrypted message.

3. The method according to claim 1, further comprising a step of deactivating the verification key and the decryption key.

4. The method according to claim 1, wherein the authentication codes Ai are generated by a secrete key authentication algorithm using the verification key CV as secrete key.

5. The method according to claim 4, wherein the secrete key authentication algorithm is the algorithm HMAC SHA 256.

6. The method according to claim 1, wherein the verification key CV is generated randomly.

7. The method according to claim 1, wherein the method is of GCM (Galois Counter Mode) or CWC (Carter Wegman Counter) type.

8. A cryptomodule, comprising one or more electronic circuits configured to implement the steps of the method according to claim 1 and a non-transitory cryptomodule memory.

9. The cryptomodule according to claim 8, wherein the non-transitory cryptomodule memory has a storage capacity less than the size of the encrypted message.

10. The cryptomodule according to claim 9, wherein the non-transitory cryptomodule memory has a storage capacity chosen to store substantially the verification key CV, the integrity codes Ii, two data blocks Bi, Di or an encrypted data block Bi and an authentication code Ai and the integrity key CI or the decryption key CD.

11. A terminal comprising a cryptomodule according to claim 8 and a memory.

12. The terminal according to claim 11, wherein the terminal is compatible with the 3GPP TS 33.180 technical specification.

13. A non-transitory memory comprising a computer program product including instructions which, when the program is executed by a computer, lead it to implement the method according to claim 1.

* * * * *